(12) United States Patent  
Roziere

(10) Patent No.: US 9,983,746 B2  
(45) Date of Patent: May 29, 2018

(54) CAPACITIVE CONTROL INTERFACE DEVICE AND METHOD ADAPTED TO THE IMPLEMENTATION OF HIGHLY RESISTIVE MEASUREMENT ELECTRODES

(71) Applicant: FOGALE NANOTECH, Nimes (FR)

(72) Inventor: Didier Roziere, Nimes (FR)

(73) Assignee: QUICKSTEP TECHNOLOGIES LLC, Wilmington, DE (US)

( * ) Notice: Subject to any disclaimer, the term of this patent is extended or adjusted under 35 U.S.C. 154(b) by 127 days.

(21) Appl. No.: 14/891,958

(22) PCT Filed: Apr. 9, 2014

(86) PCT No.: PCT/EP2014/057161  
§ 371 (c)(1),  
(2) Date: Mar. 15, 2016

(87) PCT Pub. No.: WO2014/183932  
PCT Pub. Date: Nov. 20, 2014

(65) Prior Publication Data  
US 2016/0188038 A1  Jun. 30, 2016

(30) Foreign Application Priority Data

May 17, 2013  (FR) ..................... 13 54472

(51) Int. Cl.  
*G06F 3/045* (2006.01)  
*G06F 3/044* (2006.01)  
*G06F 3/041* (2006.01)

(52) U.S. Cl.  
CPC ............ *G06F 3/044* (2013.01); *G06F 3/0416* (2013.01); *G06F 2203/04101* (2013.01); *G06F 2203/04107* (2013.01)

(58) Field of Classification Search  
CPC ................... G06F 3/0416; G06F 3/044; G06F 2203/04107; G06F 2203/04101  
See application file for complete search history.

(56) References Cited

U.S. PATENT DOCUMENTS 3,743,865 A   7/1973  Riechmann  
5,483,261 A   1/1996  Yasutake  
(Continued)

FOREIGN PATENT DOCUMENTS

CN   102 455 831 A   5/2012  
CN   204 102 115 U   1/2015  
(Continued)

OTHER PUBLICATIONS

Lee, S.K. et al. (Apr. 1985). "A Multi-Touch Three Dimensional Touch-Sensitive Tablet," *Proceedings of CHI: ACM Conference on Human Factors in Computing Systems*, pp. 21-25.  
(Continued)

*Primary Examiner* — Vijay Shankar  
(74) *Attorney, Agent, or Firm* — Morrison & Foerster LLP

(57) ABSTRACT

An interface device for detecting at least one object of interest is disclosed. The interface device has a detection surface provided with a plurality of capacitive-measurement electrodes. The measurement electrodes are driven at an alternating electrical excitation potential, and the capacitive coupling between the measurement electrodes and the object of interest can be measured. Guard elements can be driven at an alternating electrical potential substantially identical to the alternating electrical excitation potential of the measurement electrodes. The alternating electrical excitation potential has an excitation frequency low enough such that the measurement electrodes and linking tracks capacitively coupled to the object of interest have an electrical imped- (Continued)

Figure 1:
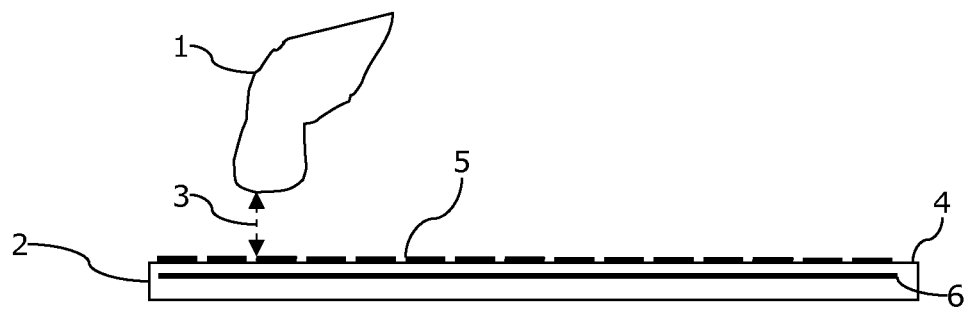

ance at the excitation frequency whose resistive part is much lower than the modulus of the reactive part.

15 Claims, 2 Drawing Sheets

(56) References Cited

U.S. PATENT DOCUMENTS

| | | | |
|---|---|---|---|
| 5,488,204 A | 1/1996 | Mead et al. | |
| 5,546,005 A | 8/1996 | Rauchwerger | |
| 5,757,196 A | 5/1998 | Wetzel | |
| 5,825,352 A | 10/1998 | Bisset et al. | |
| 5,835,079 A | 11/1998 | Shieh | |
| 5,844,506 A | 12/1998 | Binstead | |
| 5,862,248 A * | 1/1999 | Salatino | G06F 3/044 382/124 |
| 5,877,424 A | 3/1999 | Hegner et al. | |
| 5,880,411 A | 3/1999 | Gillespie et al. | |
| 5,956,415 A * | 9/1999 | McCalley | G06F 3/044 340/5.83 |
| 6,188,391 B1 | 2/2001 | Seely et al. | |
| 6,310,610 B1 | 10/2001 | Beaton et al. | |
| 6,323,846 B1 | 11/2001 | Westerman et al. | |
| 6,593,755 B1 | 7/2003 | Rosengren | |
| 6,690,387 B2 | 2/2004 | Zimmerman et al. | |
| 6,847,354 B2 | 1/2005 | Vranish | |
| 7,005,864 B2 | 2/2006 | Lannello et al. | |
| 7,015,894 B2 | 3/2006 | Morohoshi | |
| 7,119,554 B2 | 10/2006 | Nakamura et al. | |
| 7,184,064 B2 | 2/2007 | Zimmerman et al. | |
| 7,301,350 B2 | 11/2007 | Hargreaves et al. | |
| 7,570,064 B2 | 8/2009 | Roziere | |
| 7,663,607 B2 | 2/2010 | Hotelling et al. | |
| 8,149,002 B2 | 4/2012 | Ossart et al. | |
| 8,159,213 B2 | 4/2012 | Roziere | |
| 8,479,122 B2 | 7/2013 | Hotelling et al. | |
| 8,659,407 B2 | 2/2014 | Merkel et al. | |
| 8,770,033 B2 | 7/2014 | Roziere | |
| 8,917,256 B2 | 12/2014 | Roziere | |
| 9,035,903 B2 | 5/2015 | Binstead | |
| 9,104,283 B2 * | 8/2015 | Roziere | G06F 3/0418 |
| 9,250,757 B2 * | 2/2016 | Roziere | G06F 3/044 |
| 9,535,547 B2 | 1/2017 | Roziere | |
| 9,581,628 B2 | 2/2017 | Setlak et al. | |
| 2006/0038642 A1 | 2/2006 | Goins | |
| 2006/0097733 A1 | 5/2006 | Roziere | |
| 2006/0197753 A1 | 9/2006 | Hotelling | |
| 2006/0284639 A1 | 12/2006 | Reynolds | |
| 2007/0138587 A1 | 6/2007 | Shin et al. | |
| 2007/0222021 A1 | 9/2007 | Yao | |
| 2008/0284261 A1 | 11/2008 | Andrieux et al. | |
| 2008/0297675 A1 | 12/2008 | Kim | |
| 2010/0011877 A1 | 1/2010 | Izumi et al. | |
| 2010/0052700 A1 | 3/2010 | Yano et al. | |
| 2010/0259283 A1 | 10/2010 | Togura | |
| 2011/0001549 A1 | 1/2011 | Van Gastel | |
| 2011/0007030 A1 | 1/2011 | Mo et al. | |
| 2011/0169783 A1 | 7/2011 | Wang et al. | |
| 2012/0044662 A1 | 2/2012 | Kim et al. | |
| 2012/0050203 A1 | 3/2012 | Osoinach et al. | |
| 2012/0161793 A1 | 6/2012 | Satake et al. | |
| 2012/0169652 A1 | 7/2012 | Chang | |
| 2012/0187965 A1 | 7/2012 | Roziere | |
| 2012/0188200 A1 | 7/2012 | Roziere | |
| 2012/0229414 A1 | 9/2012 | Ellis | |
| 2012/0289022 A1 | 11/2012 | Kiehlbauch et al. | |
| 2013/0033469 A1 | 2/2013 | Itoh et al. | |
| 2013/0135247 A1 | 5/2013 | Na et al. | |
| 2013/0162596 A1 | 6/2013 | Kono et al. | |
| 2013/0307776 A1 | 11/2013 | Roziere | |
| 2014/0132335 A1 | 5/2014 | Rauhala et al. | |
| 2014/0267165 A1 | 9/2014 | Roziere | |
| 2014/0360854 A1 | 12/2014 | Roziere | |
| 2015/0029144 A1 | 1/2015 | Jo et al. | |
| 2015/0035792 A1 | 2/2015 | Roziere et al. | |
| 2015/0040667 A1 | 2/2015 | Tanaka | |
| 2015/0048850 A1 | 2/2015 | Neel et al. | |
| 2015/0068897 A1 | 3/2015 | Neel et al. | |
| 2016/0034102 A1 | 2/2016 | Roziere et al. | |
| 2016/0054813 A1 | 2/2016 | Schediwy et al. | |
| 2016/0179247 A1 | 6/2016 | Blondin | |
| 2016/0291730 A1 | 10/2016 | Roziere | |
| 2016/0322351 A1 | 11/2016 | Moens et al. | |
| 2016/0357338 A1 | 12/2016 | Roziere et al. | |
| 2017/0068352 A1 | 3/2017 | Blondin et al. | |
| 2017/0108968 A1 | 4/2017 | Roziere | |
| 2017/0108978 A1 | 4/2017 | Blondin et al. | |
| 2017/0220156 A1 | 8/2017 | Blondin et al. | |

FOREIGN PATENT DOCUMENTS

| | | |
|---|---|---|
| EP | 2 096 526 A2 | 9/2009 |
| EP | 2 267 791 A2 | 12/2010 |
| FR | 2 949 007 A1 | 2/2011 |
| FR | 2 971 867 A1 | 8/2012 |
| JP | S63 6829 Y2 | 2/1988 |
| JP | 2000-163031 A | 6/2000 |
| JP | 2002-342033 A | 11/2002 |
| WO | WO-2013/120071 A1 | 8/2013 |
| WO | WO-2014/076708 A2 | 5/2014 |
| WO | WO-2014/076708 A3 | 5/2014 |
| WO | WO-2014/188057 A1 | 11/2014 |
| WO | WO-2015/101700 A1 | 7/2015 |
| WO | WO-2016/067097 A1 | 5/2016 |
| WO | WO-2016/126893 A1 | 8/2016 |

OTHER PUBLICATIONS

Rubine, D.H. (Dec. 1991). "The Automatic Recognition of Gestures," CMU-CS-91-202, Submitted in Partial Fulfillment of the Requirements for the Degree of Doctor of Philosophy in Computer Science at Carnegie Mellon University, 285 pages.

Rubine, D.H. (May 1992). "Combining Gestures and Direct Manipulation," CHI ' 92, pp. 659-660.

Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.

Anonymous. (Aug. 7, 2017). "Indium tin oxide—Wikipedia", Mar. 29, 2013 (Mar. 29, 2013), XP055396619, Extrait de !'Internet: URL:https://en.wikipedia.org/w/index.php?title=Indium_tin_oxide &oldid=547596433[extrait le.

International Search Report dated Apr. 11, 2016, for PCT Application No. PCT/US2016/016472, six pages.

International Search Report dated Apr. 7, 2016 for PCT Application No. PCT/IB2015/002182, seven pages.

Non-Final Office Action dated Mar. 22, 2017, for U.S. Appl. No. 14/927,379, filed Oct. 29, 2015, eleven pages.

Notice of Allowance dated Sep. 13, 2017, for U.S. Appl. No. 14/927,379, filed Oct. 29, 2015, ten pages.

\* cited by examiner

CAPACITIVE CONTROL INTERFACE DEVICE AND METHOD ADAPTED TO THE IMPLEMENTATION OF HIGHLY RESISTIVE MEASUREMENT ELECTRODES

CROSS-REFERENCE TO RELATED APPLICATIONS

This application is a National Phase application under 35 U.S.C. § 371 of International Application No. PCT/EP2014/057161, filed Apr. 9, 2014, which claims the priority benefit of French Patent Application No. 1354472, filed May 17, 2013, the contents of which are hereby incorporated by reference in their entireties for all intended purposes.

TECHNICAL DOMAIN

The present invention concerns a capacitive control interface device adapted to the implementation of measurement electrodes with highly resistive connection tracks. It also concerns an apparatus with a control interface comprising such a device, and a method implemented in said device or said apparatus.

More particularly the domain of the invention includes but is not limited to that of tactile- and/or gesture-controlled interfaces for smart phones, tablets or touchscreens.

STATE OF THE PRIOR ART

Tactile and/or gesture control interfaces (i.e. those capable of determining the presence of control objects in their vicinity without contact) are frequently used particularly in smart phones, tablets and touchscreens. They are then transparent and superimposed on the display screen.

Many of these interfaces utilize capacitive technologies. The tactile surface is equipped with conductive electrodes connected to electronic means that make it possible to measure the variation of capacitances appearing between the electrodes and objects to be detected (such as fingers) to perform a control.

Capacitive techniques currently implemented in tactile interfaces most often utilize two layers of conductive electrodes in the form of lines and columns. The electronics measures the coupling capacitances that exist between said lines and columns. When a finger is very close to the active surface, the coupling capacitances near the finger are modified and the electronics can thus locate the position in 2D (XY), in the plane of the active surface.

These techniques are often called "mutual capacitance." They enable the presence and position of the finger to be detected through a thin dielectric material. In particular, they have the advantage of allowing a very good resolution in localizing one or more fingers in the plane (XY) of the sensitive surface. With appropriate software processing, they also make it possible to manage a large number of fingers if the surface of the interface is large enough.

Also known are techniques that make it possible to measure the absolute capacitance that appears between electrodes and an object to be detected. These techniques are also called "self capacitance."

The electrodes can also be in line and column form like the "mutual capacitance" type techniques.

There are also electrode structures called matrices with individual electrodes, often in rectangular form, distributed over the tactile surface.

Known for example is the document FR2949007 of Rozière which describes a capacitive proximity detector comprising a plurality of independent electrodes, and which makes it possible to measure the capacitance and the distance between the electrodes and one or more objects nearby.

The technology implemented uses a guard in order to eliminate any parasitic capacitance. All of the electrodes are at the same potential and there is therefore no coupling capacitance between the electrodes that is likely to degrade the measurement of the capacitance.

This technology is well-suited to the production of capacitive control interfaces in the form of tactile and gesture (3-D) transparent pads of small size, such as portable computer touchpads or screens for smart phones.

These techniques generally utilize an excitation signal (on the transmitting lines or columns for "mutual capacitance" type techniques and on all of the electrodes for "self capacitance" type techniques) the frequency of which is relatively high.

Indeed, the measurement of the capacitance to be detected is generally done with a capacitance to voltage converter using load transfer circuits with capacitive switches or load amplifiers. The analog measurement signal thus obtained, which is at the frequency of the excitation signal, is then demodulated and digitally processed.

The demodulation and digital processing solutions used in these systems generally require processing a large number of periods of the analog measurement signal in order to obtain a usable capacitance measurement. In practice, at least 10 periods of the excitation signal are used to obtain one capacitance measurement.

Moreover, the utilization of a high-frequency enables a large number of electrodes or measurement points to be processed sequentially.

For example, in order to obtain a rate of measurement of 100 images per second over an entire interface comprised of 100 electrodes (or in other words to measure 100 electrodes 100 times per second), using about 10 periods of the excitation signal to obtain each capacitance measurement, an excitation frequency of at least 100 kHz is required.

Another advantage of utilizing a frequency on the order of 100 kHz is that it makes it possible to work within a frequency window relatively far from the most common electromagnetic disturbances, including particularly the 50-60 Hz of the mains and frequencies on the order of 1 MHz and beyond of digital and radio circuits.

Finally, capacitive impedances ($1/\omega C$) obtained at these frequencies are relatively weak and therefore easier to process.

Thus, in practice the excitation frequencies currently used fall between 50 kHz and 500 kHz.

One limitation of transparent matrix electrode structures is that they require the presence on the tactile surface of connection tracks that connect each individual electrode to the electronics. Indeed, the technologies used to produce the transparent capacitive pads do not allow the use of multi-layer solutions with metallized holes as for printed circuits, where the connection tracks can be embedded beneath the electrodes.

The connection tracks and transparent electrodes are generally produced from ITO (indium-tin oxide). This material is relatively resistive (100 to 200 ohms per square), and the tracks must be made relatively wide in order to limit the total electrical resistance of these tracks. This limitation is well known by manufacturers of transparent touchpads. It is easily compatible with solutions based on electrodes in the form of lines and columns. Indeed, said lines and columns generally have a width of several millimeters, which makes it possible to obtain a total resistance of less than about 10 kilo-ohms for pads of a diagonal size up to 10 inches (250 mm).

The presence of connection tracks on the surface that supports a matrix structure of transparent electrodes utilized to make measurements in "self capacitance" mode has the disadvantage of strongly degrading the quality of detection, particularly of several fingers. Indeed, said tracks create parasitic electrodes to the degree in which they are sensitive to the presence of an object in the same way as the electrodes to which they are connected. Moreover, the wider the connection tracks are, the more significant is this effect.

One possible solution is to greatly reduce the width of said tracks in order to make their surface area as negligible as possible compared to the individual electrodes. But in this case their resistance increases greatly, which makes it necessary to limit their length to preserve a total resistance compatible with the known detection electronics. Thus, in practice this technique is limited to transparent panels of a maximum size on the order of 4 inches (100 mm).

An object of the present invention is to propose a capacitive control interface device and method that is less sensitive than the devices and methods of the prior art to the resistivity of the elements such as the electrodes, the connection tracks and the guard elements, and which is capable of producing precise measurements even with highly resistive elements.

Another object of the present invention is to propose a capacitive control interface device and method which allow the implementation of matrix structures of transparent electrodes on large-size panels.

Another object of the present invention is to propose a capacitive control interface device and method which allow the implementation of matrix structures of transparent electrodes with connection tracks on the same layer as the transparent electrodes, and arranged in such a way that the detection of control objects is not disturbed by the presence of said connection tracks.

DISCLOSURE OF THE INVENTION

This objective is achieved with an interface device for monitoring actions of at least one capacitively detectable object of interest within a measurement zone, comprising:
- a detection surface provided with a plurality of capacitive measurement electrodes,
- electronics and processing means, comprising excitation means capable of polarizing said measurement electrodes at an alternating electrical excitation potential, and measuring means capable of measuring a capacitive coupling between said measurement electrodes and at least one object of interest,
- guard elements made of an electrically conductive material, disposed in the proximity of said measurement electrodes at least along their face opposite to the measurement zone, and polarized at an alternating guard electrical potential substantially identical to said electrical excitation potential,
- electrical connection tracks disposed at least in part over said detection surface between the measurement electrodes and arranged in such a way as to connect said measurement electrodes to said electronics and processing means, characterized in that the excitation means are arranged in such a way as to generate an electrical excitation potential with an excitation frequency low enough so that the measurement electrodes capacitively coupled to at least one object of interest and their connection track have an electrical impedance at said excitation frequency the resistive part of which is far below the modulus of the reactive part.

Said electrical impedance is the complex impedance z of an electrode and of its associated track as "viewed" for example by the electronics and processing means. It comprises a resistive part R which is essentially due to the electrical resistance of the elements such as the connection track and the electrode. It also comprises a reactive part $1/j\omega C_T$ which depends on the excitation frequency f ($\omega=2\pi f$) and on the equivalent capacitance $C_T$. Said equivalent capacitance $C_T$ represents the capacitive couplings between the electrode and its connection track, and the object of interest (capacitance of interest $C_X$) as well as the environment and the guard (parasitic capacitance $C_P$), j being the imaginary unit.

It should be noted that the parasitic capacitance $C_P$ due to the coupling of the measurement electrode with the guard elements situated nearby is necessarily of a relatively large value, and is therefore non-negligible.

Advantageously, according to the invention the excitation frequency f is chosen in such a way that the resistive part R of the complex impedance z is much lower than the modulus $1/\omega C_T$ of the reactive part.

Said excitation frequency f can in particular be chosen in such a way that:
- the resistive part R does not introduce any significant measurement error, in the context of the measurement, when it is not taken into account in the calculation of the equivalent capacitance $C_T$ from the complex impedance Z;
- the resistive part R is negligible, in the context of the measurement, compared to the modulus $1/\omega C_T$ of the reactive part;
- the resistive part R is less than ½, respectively than ⅕ or ⅒, of the value of the modulus $1/\omega C_T$ of the reactive part.

The range of equivalent capacitances $C_T$ to take into account for evaluation of the preceding criteria can correspond in particular to:
- capacitances of less than or equal to the maximum possible coupling capacitance between a predetermined control object such as a finger or a stylus and a measurement electrode;
- the range of capacitances capable of being generated by the capacitive coupling between a measurement electrode and a predetermined control object (such as a finger or a stylus) which evolves in a measurement zone, also predetermined (for example between 0 and 10 cm of the electrode, or 0 and 5 cm of the electrode, or 0 and 2 cm of the electrode);
- capacitances of less than or equal to the coupling capacitance between a measurement electrode and the guard.

Depending on embodiments, the excitation frequency can be chosen in such a way that it is:
- equal to or less than 20 kHz;
- equal to or less than 10 kHz;
- equal to or less than 4 kHz;
- equal to or less than 3.5 kHz;
- between 4 and 10 kHz;
- between 3 and 20 kHz.

In particular, the excitation frequency can be less than or equal to at least one of the following values: 20 kHz, 4 kHz.

Depending on the embodiments, the device according to the invention can comprise:
- switching means capable of selectively connecting the measurement electrodes to the measurement means;

substantially transparent measurement electrodes and connection tracks;

measurement electrodes and connection tracks made of ITO;

connection tracks disposed on the detection surface in such a way as to electrically connect the measurement electrodes to the connection means disposed at the periphery of said detection surface;

measurement electrodes distributed over the detection surface in a matrix arrangement, and connection tracks arranged in such a way as to connect individually each measurement electrode to the connection means;

connection tracks the part of which is present on the detection surface has a width that is narrow enough so that the surface area of said connection tracks on said detection surface is negligible compared to the surface area of the measurement electrodes;

connection tracks the part of which is present on the detection surface has a width that is less than 100 µm.

Depending on the embodiments, the device according to the invention can comprise measurement electrodes distributed in an arrangement of lines and columns. Said electrodes can be produced in two superimposed layers of material, or can consist of patches produced in one layer of material and connected to each other by bridge connections in such a way as to constitute lines and columns.

Advantageously, the device according to the invention enables panels or measurement surfaces to be produced, which in particular are transparent, in a way that is simple and inexpensive, and which allow precise measurements. Indeed:

the electrodes and the connection tracks can be disposed on the same surface in a single layer of conductive material (for example ITO), which allows production costs to be minimized;

the connection tracks can be produced with a width that is narrow enough that they have little or no significant influence on detection of an object of interest. Said influence is geometric in nature: it depends on the width of the connection track on the detection surface, which determines the surface of the track and therefore the coupling capacitance which can appear between an object of interest and said connection track. Since said capacitive coupling is attributed to the electrode to which the track is connected, it introduces an error in the localization in the plane of the control surface of the object of interest. Thus, said geometric error can be minimized with the device according to the invention;

narrow connection tracks are highly resistive, but as previously explained, the device according to the invention is capable of making precise capacitance measurements even under such conditions.

Moreover, it should be noted that the device according to the invention can be designed in such a way as to provide overall optimization of the measurement characteristics:

the track width on the measurement surface can be selected in such a way that localization errors due to capacitive couplings between the object of interest and the connection tracks are negligible or at least acceptable;

the excitation frequency f can then be chosen as previously explained, based on the value of the resistive part R which is determined by the chosen track widths and their resistivity.

Depending on the embodiments, the device according to the invention can comprise measurement means that are at least in part referenced to the electrical excitation potential.

According to another aspect, a method is proposed for monitoring actions of at least one object of interest detectable capacitively in a measurement zone, implementing:

a detection surface provided with a plurality of capacitive measurement electrodes, electronics and processing means comprising excitation means and measurement means, guard elements of an electrically conductive material disposed in the proximity of said measurement electrodes at least along their face opposite to the measurement zone, and electrical connection tracks disposed at least in part on said detection surface between measurement electrodes and arranged in such a way as to connect said measurement electrodes to said electronics and processing means, said method comprising the steps of:

polarization of said measurement electrodes at an alternating electrical excitation potential, polarization of the guard elements at an alternating electrical guard potential substantially identical to said electrical excitation potential, measurement of a capacitive coupling between at least one measurement electrode and at least one object of interest, said method further comprising a step of generating an electrical excitation potential with an excitation frequency low enough so that the measurement electrodes capacitively coupled to the at least one object of interest and their connection track have an electrical impedance at said excitation frequency the resistive part of which is far below the modulus of the reactive part.

The measurement of the capacitive coupling can comprise the steps of:

acquisition of a measurement signal at the frequency of the electrical excitation potential representative of the electrical charge of the at least one measurement electrode, digitization of said measurement signal, and analysis of its temporal form to determine its amplitude.

According to yet another aspect, and apparatus is proposed comprising an interface device according to the invention.

Said apparatus can comprise a display screen and a detection surface provided with a plurality of transparent capacitive measurement electrodes superimposed on said display screen.

Depending on the embodiments, said apparatus can be one of the following types: smart phone, tablet, touchscreen.

DESCRIPTION OF THE FIGURES AND EMBODIMENTS

Figure 2:
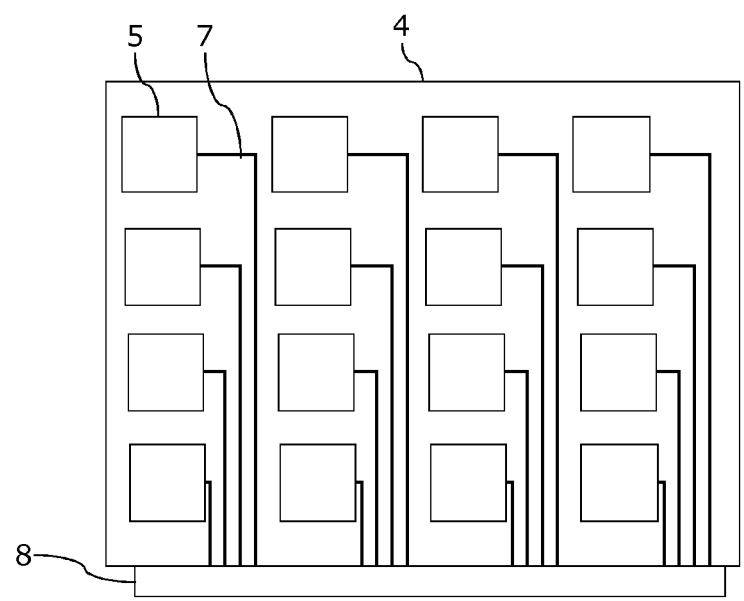
Figure 3:
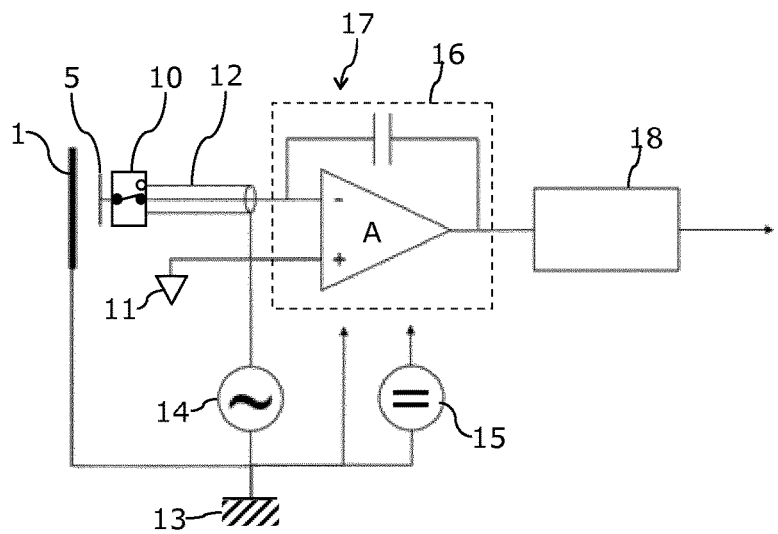
Figure 4:
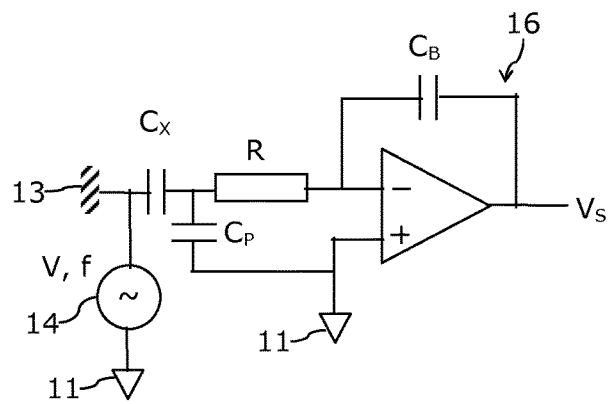
Figure 5:
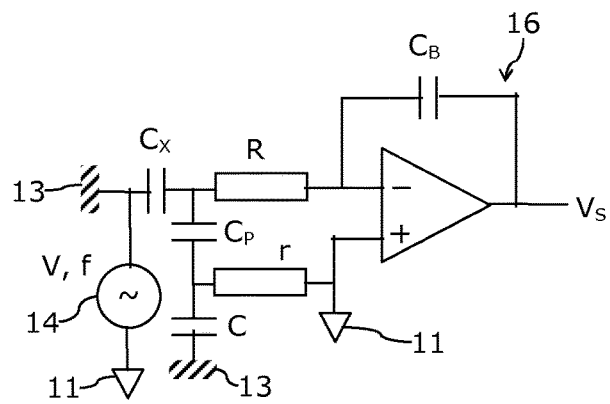

Other advantages and details of the invention will be seen from the detailed description of non-limiting implementations and embodiments and with reference to the following drawings in which:

FIG. 1 illustrates a cross-sectional view of a measurement interface implemented in an interface device according to the invention, FIG. 2 illustrates a front view of a measurement interface implemented in an interface device according to the invention, FIG. 3 presents a schematic diagram of capacitive detection electronics implemented in an interface device according to the invention, FIG. 4 presents an electronic diagram equivalent to the one of FIG. 3 which takes into account the resistivity of the connection tracks and the leakage capacitances resulting therefrom, FIG. 5 presents an electronic diagram equivalent to the one of FIG. 3 which takes into account the resistivity of the connection tracks and of the guard elements, and the leakage capacitances deriving therefrom.

A non-limiting example will now be described of an embodiment of a control interface according to the invention.

Such a control interface is particularly adapted to the production of tactile and contactless control interfaces, or man-machine interfaces, for systems or apparatuses such as portable telephones (smart phones), tablets, computers or control pads.

With reference to FIG. 1 and FIG. 2, the control interface 2 comprises a detection surface 4 provided with capacitive measurement electrodes 5.

Said measurement electrodes 5 are distributed for example according to a matrix disposition on the detection surface 4, as shown in FIG. 2.

The measurement electrodes 5 are produced from a substantially transparent conductive material, for example such as ITO (indium-tin oxide) deposited on a dielectric material (glass or polymer). They can be superimposed on a display screen, such as TFT (thin film transistor) or OLED (organic light emitting diodes).

The measurement electrodes 5 can detect the presence and/or the distance of at least one object of interest 1, which is also a control object 1, in a measurement zone. Preferably, the measurement electrodes 5 and their associated electronics are configured so as to enable the simultaneous detection of a plurality of objects 1.

The position of the object 1 or objects 1 in the plane of the detection surface 4 is determined from the position (on said detection surface 4) of the measurement electrodes 5 which detect the objects 1.

The distance 3, or at least information representative of the distance 3, between the objects 1 and the detection surface is determined from the measurements of the capacitive coupling between the electrodes 5 and the objects 1.

One or more guard electrodes 6 are positioned along the rear face of the measurement electrodes 5, relative to the zone of detection of the objects 1. They are also produced from a substantially transparent conductive material, such as for instance ITO (indium-tin oxide), and are separated from the measurement electrodes 5 by a layer of dielectric material.

With reference to FIG. 3, the measurement electrodes 5 are connected to the electronic means of capacitive measurement 17.

Advantageously, said connection is accomplished in particular by substantially transparent connection tracks 7 which are disposed over the detection surface 4 between the electrodes 5. Said connection tracks 7 are produced from the same material as the electrodes 5, such as for example ITO (indium-tin oxide). The connection tracks 7 and the electrodes 5 can be deposited simultaneously, in one or the same layers.

The connection tracks 7 are connected to connection means 8 situated at the periphery of the detection zone 4, outside the transparent working zone. Said connection means 8 are in turn connected to the electronic means of capacitive measurement 17.

The electronic means of capacitive measurement 17, in the embodiment of FIG. 3, are produced in the form of a floating bridge capacitive measurement system as described for example in the document FR 2 949 007 of Rozière.

The detection circuit comprises a so-called floating part 16 the reference potential 11 of which, called guard potential 11, oscillates with respect to the mass 13 of the overall system, or to ground. The alternating potential difference between the guard potential 11 and the mass 13 is generated by an excitation source, or an oscillator 14.

The guard electrodes 6 are connected to the guard potential 11.

The floating part 16 comprises the sensitive part of the capacitive detection, including in particular a load amplifier. It can of course comprise other means of processing and conditioning the signal, including digital means are those based on microprocessor, also referenced to the guard potential 11.

The electrical power supply of the floating part 16 is provided by floating power transfer means 15, comprising for example DC/DC converters.

Said capacitive measurement system enables capacitance information to be measured between at least one measurement electrode 5 and a control object 1.

The control object 1 should be connected to a different potential then the guard potential 11, such as for example the mass potential 13. This is the configuration when the control object 1 is a finger of the user whose body defines a mass, or an object (such as a stylus) manipulated by said user.

The device according to the invention can further comprise analog switches 10, controlled by electronic control means. Said switches 10 allow measurement electrodes 5 to be selected individually and to be connected to the capacitive detection electronics 17 for measuring the coupling capacitance with the object 1. The switches 10 are configured in such a way that a measurement electrode 5 is connected either to the capacitive detection electronics 17 or to the guard potential 11.

Thus the switches 10 enable all of the measurement electrodes 5 to be queried sequentially in order to obtain an image of the capacitive coupling between one or more control objects 1 and the measurement electrodes 5.

Different configurations are possible within the scope of the invention:
- the capacitive detection electronics 17 can comprise as many detection paths in parallel, each with its load amplifier, as there are measurement electrodes 5 to be queried. In this case, the device does not necessarily comprise switches 10;
- the capacitive detection electronics 17 can comprise a plurality of detection paths in parallel each with its load amplifier, and the switches 10 can be configured so that each detection path can sequentially query a plurality of measurement electrodes 5;
- the capacitive detection electronics 17 can comprise only one detection path, and switches 10 configured so as to be able to sequentially query all of the measurement electrodes 5. This is the configuration illustrated in FIG. 3;

Preferably, the sensitive part of the detection is protected by guard shielding 12 connected to the guard potential 11.

The active measurement electrodes 5, i.e. those that are connected (directly or by a switch 10) to the capacitive detection electronics 17 for performing measurements, are at the guard potential 11. Said active measurement electrodes 5 are surrounded by guard planes consisting of guard electrodes 6 connected to the guard potential 11, and possibly by inactive measurement electrodes 5, i.e. connected by a switch 10 to the guard potential 11.

Thus the appearance of parasitic capacitances is avoided between said active measurement electrodes 5 and their environment, so that only their capacitive coupling with the object of interest 1 is measured with maximum sensitivity.

The floating electronics 16 are connected at the output to the electronics of the system 18 referenced to the mass by electrical connections compatible with the difference of reference potentials. Said connections can comprise for example differential amplifiers or opto-couplers.

With reference to FIG. 4, the load amplifier 16 as implemented in the schematic of FIG. 3 allows the capacitance $C_X$ created between an electrode 5 and the control object 1 to be converted into voltage.

An advantage of this technique is that when the resistance R of the connection track 6 is negligible, the measurement of the capacitance $C_X$ depends very little on the value of the frequency f of the excitation signal generated by the excitation source 14. Indeed, in this case the signal $V_S$ at the output of the load amplifier is:

$$V_S = V(C_X/C_B). \tag{Eq. 1}$$

V is the amplitude of the excitation signal generated by the excitation source 14, and $C_B$ is the counter-reaction capacitance of the load amplifier 16.

When the resistance R is no longer negligible, the signal $V_S$ at the output of the load amplifier then becomes:

$$V_S = V(C_X/C_B)(1/(1+jR(C_X+C_P)\omega)). \tag{Eq. 2}$$

$C_P$ is the parasitic capacitance created between the guard 11 and the measurement electrode 5 with the connection track 7, $\omega = 2\pi f$ and j is the imaginary unit.

The resistance R of the connection tracks 7 is therefore a problem according to several aspects:
  it causes a sensitivity to the parasitic capacitances Cp between the electrode 5 and the guard 11, due to the voltage drop in the resistive connection track 7, the guard therefore becomes flawed;
  said parasitic capacitances $C_P$ are unknown and contribute directly to the measurement error of the capacitance of interest $C_X$. Indeed, the measured capacitance is the equivalent capacitance $C_T$ which is affected by the parasitic capacitances $C_P$ ($C_T \approx C_X + C_P$);
  the higher the excitation frequency f, the greater is the contribution of this error.

This explains why the matrix configuration of measurement electrodes 5 as shown in FIG. 2, in spite of its simplicity, is not currently used to produce transparent panels of large size with a large number of electrodes.

Indeed, as explained previously, in order for the presence of the connection tracks 7 between the measurement electrodes 5 not to disturb the detection and localization of the object of interest 1, their width must be reduced, for example to at least 100 μm. The resistances of said connection tracks 7 can then easily exceed 100 kilo-ohms when they are produced from ITO.

Under these conditions, in order to obtain a signal $V_S$ at the output of the load amplifier which is directly representative of $C_X$, the following condition must be fulfilled:

$$R \cdot (C_X + C_P) \cdot \omega \ll 1. \tag{Eq. 3}$$

Advantageously, this condition can be satisfied by choosing an excitation frequency f such that:

$$f \ll 1/(2\pi R(C_X + C_P)) \tag{Eq. 4}$$

In practice, equivalent capacitance values $C_T \approx C_X + C_P$ are achieved on the order of 40 pF. Under these conditions, the excitation frequency f should be less than about 20 kHz.

In pulsed operation, i.e. using for example a square excitation signal, the same order of magnitude of frequency f is obtained.

Under these conditions, by way of non-limiting example, an excitation frequency f of less than 10 kHz can be chosen so that the term to the left of Eq. 3 has an impact on the capacitance measurement $C_X$ of less than 10%.

An excitation frequency f on the order of 3.5 kHz can also be chosen, for example, so that the term to the left of Eq. 3 has an even smaller impact on the capacitance measurement $C_X$ (on the order of 1%).

In practice, the measurement signal $V_S$ is a signal modulated at the excitation frequency f, and it is its modulation amplitude at said excitation frequency f that is representative of the capacitance measurement.

The measurement signal Vs can be demodulated by a synchronous demodulator in the electronics of the system 18, referenced to the mass. However, this approach has the disadvantage of requiring a large number of periods of the excitation signal to obtain one measurement value.

According to a preferred embodiment, the device according to the invention comprises means of sampling and digitizing that make it possible to directly digitize the measurement signal $V_S$, for example in the electronics of the system 18 referenced to the mass. The lower the excitation frequency f, the easier this digitization is. The modulation amplitude at the excitation frequency f is then directly deduced from an analysis of the temporal form of one or several periods of said measurement signal $V_S$.

Thus, a panel comprising several hundred measurement electrodes 5 can be "read" several times per second, even with an excitation frequency of less than 10 kHz.

FIG. 5 represents a diagram equivalent to the complete structure of a control interface 2 in the form of a transparent panel 2 superimposed on a display screen.

The guard plane 6, made of ITO, has an electrical resistance r much lower than that of the connection tracks 7, but which is still significant. Indeed, said guard electrical resistance r can be on the order of several tens to several hundreds of ohms, depending on the nature of the ITO deposited and on the size of the screen.

There is a capacitive coupling C between the guard plane 6 and the part of the apparatus beneath it (LCD screen, chassis of the pad, etc.). As illustrated in FIG. 5, said capacitance C with the guard resistance r creates a capacitive leak "seen" by the electronics in spite of the presence of the guard plane 6. Indeed, the potential of the guard 6 present beneath the electrodes 5 drops slightly because of the coupling (r, C).

This phenomenon can generate a capacitive offset of several tens of femto-farads.

Advantageously, the invention and in particular the implementation of a low excitation frequency f also enables said capacitive leakage to be rendered negligible.

Of course, the invention is not limited to the examples that have just been described, and numerous developments can be made to these examples without going beyond the scope of the invention.

The invention claimed is:

1. An interface device for detecting at least one object of interest in a measurement zone, comprising:
    a detection surface provided with a plurality of capacitive measurement electrodes,
    electronic processing means comprising excitation means capable of polarizing said measurement electrodes at first alternating excitation electrical potential, and measurement means capable of measuring a capacitive coupling between said measurement electrodes and at least one object of interest, guard elements made of electrically conductive material, disposed near said measurement electrodes at least according to their face opposite the measurement zone, and polarized to an alternating guard electrical potential referenced to said first alternating excitation electrical potential, and electrical connection paths disposed at least in part on said detection surface between the measurement electrodes and arranged in such a way as to connect said measurement electrodes to said electronic processing means, wherein the excitation means are arranged in such a way as to generate the first alternating excitation electrical potential with an excitation frequency so that the measurement electrodes coupled capacitively to at least one object of interest and their connection path have an electrical impedance at said excitation frequency the resistive part of which is below the modulus of the reactive part.

2. The device of claim 1, wherein the excitation frequency is less than or equal to 20 kHz.

3. The device of claim 1, further comprising switching means capable of selectively connecting the measurement electrodes to the measurement means.

4. The device of claim 1, wherein the measurement electrodes and connection paths are substantially transparent.

5. The device of claim 4, wherein the measurement electrodes and connection paths are made of ITO.

6. The device of claim 1, wherein the connection paths are disposed on the detection surface in such a way as to electrically connect the measurement electrodes to connection means disposed at a periphery of said detection surface.

7. The device of claim 6, wherein the measurement electrodes are distributed on the detection surface in a matrix arrangement, and the connection paths are arranged in such a way as to individually connect each measurement electrode to the connection means.

8. The device of claim 1, wherein the connection paths on the detection surface have a width that is sufficiently narrow so that a surface area of said connection paths on said detection surface is negligible compared to the surface area of the measurement electrodes.

9. The device of claim 1, wherein the connection paths on the detection surface, have a width of less than 100 µm.

10. The device of claim 1, wherein the measurement means are at least in part referenced to the excitation electrical potential.

11. An apparatus comprising an interface device according to claim 1.

12. The apparatus according to claim 11, comprising a display screen, the detection surface provided with the plurality of capacitive measurement electrodes superimposed on said display screen.

13. The apparatus according to claim 11, the apparatus comprising one of the following types: smart phone, tablet, touchscreen.

14. A method of detecting at least one object of interest in a measurement zone, implementing:

a detection surface provided with a plurality of capacitive measurement electrodes, electronic processing means comprising excitation means and measurement means, guard elements made of an electrically conductive material, which are disposed near said measurement electrodes at least according to their face opposite to the measurement zone, and electrical connection paths disposed at least in part on said detection surface between measurement electrodes and arranged in such a way as to connect said measurement electrodes to said electronic processing means, which method comprises:

polarizing said measurement electrodes to a first alternating excitation electrical potential, polarizing the guard elements to an alternating guard electrical potential referenced to the first alternating excitation electrical potential, measuring a capacitive coupling between at least one measurement electrode and at least one object of interest, and generating the first alternating excitation electrical potential with a sufficiently low excitation frequency so that the measurement electrodes capacitively coupled to the at least one object of interest and their connection path have an electrical impedance at said excitation frequency the resistive part of which is far below the modulus of the reactive part.

15. The method of claim 14, wherein the measurement of the capacitive coupling comprises:

acquiring a measurement signal at a frequency of the first alternating excitation electrical potential representative of an electrical charge of the at least one measurement electrode, digitizing said measurement signal, and analyzing its temporal form to determine its amplitude.

* * * * *